US011670176B2

(12) United States Patent
Stewart et al.

(10) Patent No.: US 11,670,176 B2
(45) Date of Patent: Jun. 6, 2023

(54) APPARATUS, SYSTEM AND METHOD FOR MANAGING AIRSPACE FOR UNMANNED AERIAL VEHICLES (71) Applicant: General Electric Company, Schenectady, NY (US)

(72) Inventors: Ken Harold Stewart, Menlo Park, CA (US); Vineet Mehta, Boston, MA (US)

(73) Assignee: General Electric Company, Schenectady, NY (US)

(*) Notice: Subject to any disclaimer, the term of this patent is extended or adjusted under 35 U.S.C. 154(b) by 225 days.

(21) Appl. No.: 16/940,914

(22) Filed: Jul. 28, 2020

(65) Prior Publication Data

US 2020/0357288 A1 Nov. 12, 2020

Related U.S. Application Data (63) Continuation of application No. 15/895,517, filed on Feb. 13, 2018, now Pat. No. 10,755,584.

(51) Int. Cl.
*G08G 5/00* (2006.01)
*H04W 4/02* (2018.01)
*B64C 39/02* (2023.01)

(52) U.S. Cl.
CPC ........... *G08G 5/0013* (2013.01); *G08G 5/003* (2013.01); *G08G 5/0026* (2013.01);
(Continued)

(58) Field of Classification Search
CPC .... G08G 5/0013; G08G 5/0026; G08G 5/003; G08G 5/0034; G08G 5/0043;
(Continued)

(56) References Cited

U.S. PATENT DOCUMENTS 7,957,853 B2 6/2011 Stock et al.
8,456,328 B2 6/2013 Karthikeyan et al.
(Continued)

FOREIGN PATENT DOCUMENTS

CN 104809918 B 7/2017
KR 1020170097106 A 8/2017
(Continued)

OTHER PUBLICATIONS

Extended European Search Report for EP Application No. 19754700.3 dated Sep. 30, 2021 (11 pages).
(Continued)

*Primary Examiner* — Mary Cheung
(74) *Attorney, Agent, or Firm* — Dinsmore & Shohl LLP (57) ABSTRACT An apparatus, system and method for managing airspace for unmanned aerial vehicles (UAVs). The apparatus, system and method may include a platform comprising at least records of certified administratively acceptable requestors of restricted use of the airspace for UAVs, a plurality of airspace management rules for UAVs, and a broadcaster for providing notifications over at least one telecommunications network; and a plurality of applications, each instantiated by a processor on one of a plurality of corresponded devices by non-transitory computing code, wherein the plurality of corresponded devices comprises at least a plurality of mobile devices. A first of the plurality of applications may be capable of receiving the restricted UAV use request from a requestor within a physical area of the restricted UAV use request, and of forwarding the restricted UAV use request and an identification of the requestor to the platform over the at least one telecommunications network.

21 Claims, 6 Drawing Sheets (52) U.S. Cl.
CPC ......... *G08G 5/0034* (2013.01); *G08G 5/0043* (2013.01); *G08G 5/0069* (2013.01); *H04W 4/02* (2013.01); *B64C 39/024* (2013.01)

(58) Field of Classification Search
CPC ....... G08G 5/0069; G08G 5/006; H04W 4/02; H04W 4/021; B64C 39/024
See application file for complete search history.

(56) References Cited

U.S. PATENT DOCUMENTS

| | | | |
|---|---|---|---|
| 8,723,686 | B1 | 5/2014 | Murray et al. |
| 9,646,502 | B1 * | 5/2017 | Gentry ................. G08G 5/0013 |
| 9,704,408 | B2 | 7/2017 | Yu et al. |
| 9,821,910 | B1 | 11/2017 | Suiter |
| 10,054,941 | B1 | 8/2018 | Beard |
| 2012/0215382 | A1 | 8/2012 | Lee et al. |
| 2014/0018979 | A1 | 1/2014 | Goossen et al. |
| 2016/0125741 | A1 | 5/2016 | Shorter, Jr. et al. |
| 2016/0140851 | A1 | 5/2016 | Levy et al. |
| 2016/0253907 | A1 | 9/2016 | Taveira |
| 2016/0275801 | A1 | 9/2016 | Kopardekar |
| 2016/0284221 | A1 | 9/2016 | Hinkle et al. |
| 2016/0291589 | A1 | 10/2016 | Ashoori et al. |
| 2017/0025022 | A1 | 1/2017 | Henry et al. |
| 2017/0076610 | A1 | 3/2017 | Liu et al. |
| 2018/0046180 | A1 | 2/2018 | Falk et al. |
| 2018/0218619 | A1 * | 8/2018 | Brown ................. G08G 5/0069 |
| 2018/0324546 | A1 | 11/2018 | Jones |
| 2019/0114925 | A1 | 4/2019 | Schulman et al. |

FOREIGN PATENT DOCUMENTS

| | | | |
|---|---|---|---|
| WO | 2016164892 A1 | 10/2016 | |
| WO | 2017084031 A1 | 5/2017 | |
| WO | WO-2017084031 A1 * | 5/2017 | ............. G05D 1/106 |
| WO | WO-2017161386 A1 * | 9/2017 | ........... B64C 39/024 |

OTHER PUBLICATIONS

Chinese Patent Application No. 201980013107.0 Office Action, Dec. 28, 2021 (21 pages with English Translation).

Zuschlag Michael, "Violations of Temporary Flight Restrictions and Air Defense Identification Zones: An Analysis of Airspace Violations and Pilot Report Data", NASA Technical Reports Server, Sep. 1, 2005.

Ahrens et al., "Graphical data linked TFRs and NextGen", 2011 Integrated Communication, Navigation, and Surveillance Conference Proceedings, pp. 1-28, Herndon, May 10-12, 2011.

International Search Report and Written Opinion for application PCT/US2019/014860 dated May 15, 2019 (10 pages).

* cited by examiner

APPARATUS, SYSTEM AND METHOD FOR MANAGING AIRSPACE FOR UNMANNED AERIAL VEHICLES

CROSS-REFERENCE TO RELATED APPLICATIONS

This application is a continuation of U.S. Non-provisional patent application Ser. No. 15/895,517, entitled "Apparatus, System And Method For Managing Airspace For Unmanned Aerial Vehicles," filed Feb. 13, 2018, the contents of which as hereby incorporated by reference in their entirety.

BACKGROUND

Field of the Disclosure

The present disclosure relates to airspace for flying vehicles, and, more specifically, to an apparatus, system and method for managing airspace for unmanned aerial vehicles.

Description of the Background

Few technologies today command as much interest and excitement as drones, also referred to as small-unmanned aerial vehicles (sUAV). These sUAVs are a subset of a broader category of technologies referred to as unmanned aerial vehicles (UAVs). UAVs do offer significant value in the entertainment and leisure industry, and that significant value has largely led to aforementioned interest and excitement around the UAV industry, but UAVs also provide an emerging economic opportunity. For example, it has been proposed that UAV use be further expanded into commercial services, such as safety and security, product delivery, real estate and surveys, and so on.

Of course, in some commercial (and governmental) contexts outside of entertainment and leisure, the use of UAVs is not new. For example, drones equipped with cameras and sensor payloads have been used by military and border control agencies for decades to improve situational awareness. Further, UAVs are presently employed as "eyes-in-the-sky" for law enforcement and first responders. The increased use of UAVs in both of these areas is part of the expansion in UAV usage referenced above.

While the growth in applications for UAVs presents economic opportunity, it also presents significant challenges, such as to first responders, safety and security personnel, and other aircraft such as may be monitored by the Federal Aviation Administration (FAA). By way of example, there is no system in place presently to locally and/or in real time manage airspace for UAVs. Because of this, there may be detrimental impact on aircraft having FAA approved flight plans, and on first responder activity, stemming from unmanaged UAV operation.

For example, UAVs have already interfered with firefighting planes battling forest and wild fires. UAVs in a fire context can cause operations delays, which can endanger lives. More particularly, if there is a chance of a collision with a UAV, firefighting planes and helicopters must be grounded to avoid loss of life and/or severe equipment damage. For these and other reasons, the use of UAVs, and more particularly the lack of management of airspace for UAVs over fire-ravaged areas, is a cause of increased damage to property and lives.

In a law enforcement context, the unmanaged use of UAVs can degrade emergency response times, such as due to forcing law enforcement vehicles from the air, and thus may recklessly endanger the public. For example, authorized aircraft, for safety reasons, must hold if there are unauthorized UAVs in the subject airspace. This slows emergency response times, and increases response costs in that the authorized aircraft must sit idle while waiting for clearance to enter the subject airspace, after expenditure of the time and expense to prepare the authorized aircraft for the emergency response. Emergency response costs are further increased by the need to bring in additional resources, beyond the typical emergency response resources, in an emergency setting so that those additional resources can clear the airspace for the emergency response resources.

Moreover, the use of UAVs in airspace over crime and search scenes can impede criminal investigations and compromise crime scene integrity. For search and rescue operations, private UAVs can create airspace conflict, which minimizes the positive impact of a search and rescue response. This airspace conflict may cause varying degrees of adverse consequences, ranging from limitations on available search/rescue and crime investigation resources, to suspension of search/rescue and crime scene operations, to urgent collision-avoidance in order to prevent loss of life, equipment damage, or other terrible consequences.

Yet further, the use of UAVs can conflict with the needs of the Departments of Defense and Homeland Security, which may impact the safety of the nation and its citizens. For example, an UAV recently collided with a Black Hawk helicopter over Staten Island, N.Y., severely damaging the helicopter and ending its flight mission. UAVs have crashed into power plants, causing heightened security alerts, and significant expenditures of taxpayer dollars to assess whether such crashes are intentional. Thus, the misuse of UAVs can cause false alarms or heightened national or local security alerts, even if the misuse is actually innocent.

Although the FAA has a registration process for airspace (as do some local authorities and agencies), typically the approval process to restrict airspace takes 24 hours or more. Because of the speed of this approval process, or more pointedly the lack of speed, it is nearly impossible to tell authorized aircraft from authorized aircraft in a restricted airspace in real time. It is also difficult if not impossible to punish unauthorized aircraft, if for no other reason than the urgency typically required in an emergency circumstance to restrict airspace is not met by the current airspace restriction request processes, and as such, by the time an airspace restriction request can be granted in the current processes, the need to restrict the airspace has often passed.

Accordingly, there is a need to help protect the police, fire, emergency medical services, and other public safety personnel who put themselves in danger to protect the communities they serve, at least by providing traffic management for UAVs that might otherwise interfere with the work of public safety personnel. Further, there is a need to enhance public safety and minimize the cost of public safety through the providing of traffic management for UAVs.

SUMMARY

The disclosure includes at least an apparatus, system and method for managing airspace for unmanned aerial vehicles (UAVs). The apparatus, system and method may include a platform comprising at least records of certified administratively acceptable requestors of restricted use of the airspace for UAVs, a plurality of airspace management rules for UAVs, and a broadcaster for providing notifications over at least one telecommunications network; and a plurality of applications, each instantiated by a processor on one of a plurality of corresponded devices by non-transitory computing code, wherein the plurality of corresponded devices comprises at least a plurality of mobile devices. A first of the plurality of applications may be capable of receiving the restricted UAV use request from a requestor within a physical area of the restricted UAV use request, and of forwarding the restricted UAV use request and an identification of the requestor to the platform over the at least one telecommunications network. Responsive to the restricted use request deemed to be one of the administratively acceptable requestor by the platform based on a comparison of the identification to the records, the platform broadcasts a notification of the restricted UAV use in accordance with the plurality of airspace management rules.

The notification may additionally be broadcast by the platform to at least one peered application. The peered application may comprise a manned aircraft airspace management application.

Each of the plurality of applications may be capable of accepting a UAV flight plan and forwarding the received UAV flight plan to the platform. The plurality of airspace management rules may further comprise flight plan approval and deconfliction rules, and the UAV flight plan may be approved by the platform according to a comparison of the UAV flight plan to the flight plan approval rules.

Upon violation of the notification by at least one non-conforming UAV, the platform may further be capable of comparing the records to an identification of the non-conforming UAV and broadcasting the identification of the non-conforming user to at least one of the plurality of applications. The at least one of the applications that receives the non-conforming user may be corresponded to law enforcement.

Thus, the disclosed embodiments provide an apparatus, system, and method to help protect the police, fire, emergency medical services, and other public safety personnel who put themselves in danger to protect the communities they serve, at least by providing traffic management for UAVs that might otherwise interfere with the work of public safety personnel. Further, the disclosed embodiments enhance public safety and decrease the cost of public safety through the providing of traffic management for UAVs

BRIEF DESCRIPTION OF THE DRAWINGS

The disclosed non-limiting embodiments are discussed in relation to the drawings appended hereto and forming part hereof, wherein like numerals may indicate like elements, and in which.

DETAILED DESCRIPTION

The figures and descriptions provided herein may have been simplified to illustrate aspects that are relevant for a clear understanding of the herein described apparatuses, systems, and methods, while eliminating, for the purpose of clarity and/or brevity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of clarity and/or brevity a discussion of such elements and operations may not be provided herein. However, the present disclosure is deemed to nevertheless include all such elements, variations, and modifications to the described aspects that would be known to those of ordinary skill in the art in light of the instant disclosure.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may thus be embodied in different forms. As such, the embodiments conveyed should not be construed to limit the scope of the disclosure.

The terminology used herein is for the purpose of describing the particular example embodiments set forth only and is not intended to be limiting. For example, as used herein, the singular forms "a", "an" and "the" may be intended to include the plural forms as well, unless the context clearly indicates otherwise. Further, the terms "comprises," "comprising," "including," and "having," are inclusive and therefore may indicate the presence of stated features, integers, steps, operations, elements, and/or components, and, in any event, do not preclude the presence or addition of one or more other features, integers, steps, operations, elements, components, and/or groups thereof.

Although the terms first, second, third, etc., may be used herein to describe various elements, components, steps, regions, layers and/or sections, these elements, components, steps, regions, layers and/or sections should not be deemed to be limited by these terms. These terms may be only used to distinguish one element, component, step, region, layer or section from another element, component, step, region, layer or section, unless an indication is given to the contrary. Thus, terms such as "first," "second," and other numerical terms when used herein do not imply a sequence or order unless explicitly stated or clearly indicated by the context. Thus, a first element, component, step, region, layer or section discussed below could be termed a second element, component, step, region, layer or section without departing from the teachings of the exemplary embodiments.

Correspondingly and notwithstanding the use of terms such as "first" or "second" in association therewith, it should be noted that the method steps, processes, and operations described herein are not to be construed as necessarily requiring their performance in the particular order discussed or illustrated, unless specifically identified as a necessary order of performance. It is also to be understood that additional or alternative steps may be employed.

Processor-implemented modules, engines, applications, systems and methods of use are disclosed herein that may provide networked access to a plurality of types of digital content, including but not limited to video, image, text, audio, data, metadata, algorithms, interactive and document content, which may track, deliver, manipulate, transform and report the accessed digital content. Described embodiments of these modules, engines, applications, systems and methods are intended to be exemplary and not limiting. As such, it is contemplated that the herein described apparatuses, systems and methods may be adapted and may be extended to provide enhancements and/or additions to the exemplary modules, engines, applications, systems and methods described, and the disclosure is thus intended to include all such extensions.

It should also be understood that the terms "platform", "application", "module" and "engine", as used herein, do not limit the functionality to particular physical modules, but may include any number of tangibly-embodied software and/or hardware components having a transformative effect on at least a portion of a disclosed system and its data. In general, a computer program product in accordance with software-related embodiments may comprise a tangible computer usable medium (e.g., standard RAM, ROM, EEPROM, an optical disc, a USB drive, or the like) having computer-readable program code embodied therein, wherein the computer-readable program code is adapted to be instantiated or otherwise executed by a processor (which may work in connection with an operating system) to implement the one or more systems, functions and methods as described herein. In this regard, the disclosed software may be implemented in any desired language, and may be implemented as machine code, assembly code, byte code, interpretable source code, or the like (e.g., via C, C++, C#, Java, Actionscript, Objective-C, Javascript, CSS, XML, etc.), unless noted otherwise and by way of non-limiting example.

The embodiments provide improved public safety, at least by providing the localized, real-time dynamic airspace management required for the expected explosive growth in the use of UAVs. The embodiments may provide at least a local airspace management and certification system for UAVs. The management and certification system may be or include an integrated, certifiable smartphone-based application. The system may offer first responders and similar personnel a local or system-wide, real-time communication to proactively clear the air of UAVs, and/or to make the presence of UAVs in an airspace criminal conduct.

More particularly, incident commanders, such as first responder on-site coordinators, are provided the capability in some embodiments to dynamically manage local airspace for UAVs in real time from on-site. The dynamic UAV airspace management systems and methods disclosed operate in support of federal and state laws, and applicable rules, regulations and policies, such as those provided by the FAA.

The systems and methods herein provide system-wide or localized notifications, such as uniform notifications, from and to law enforcement and emergency respondents and responder agencies, the FAA and other relevant federal agencies, airport towers and other relevant groups or organizations, regarding certified air space management requests. That is, as illustrated in the system 100 of FIG. 1, an airspace management (i.e., a restriction) request 102 may be input by an authorized party 104, along with a situs and/or a radius 106 to which the restriction request 102 is applicable. As used herein, it will be appreciated that a request 102 reviewed for grantability may also include the cancellation of a previously granted restriction, by way of non-limiting example.

Figure 1:
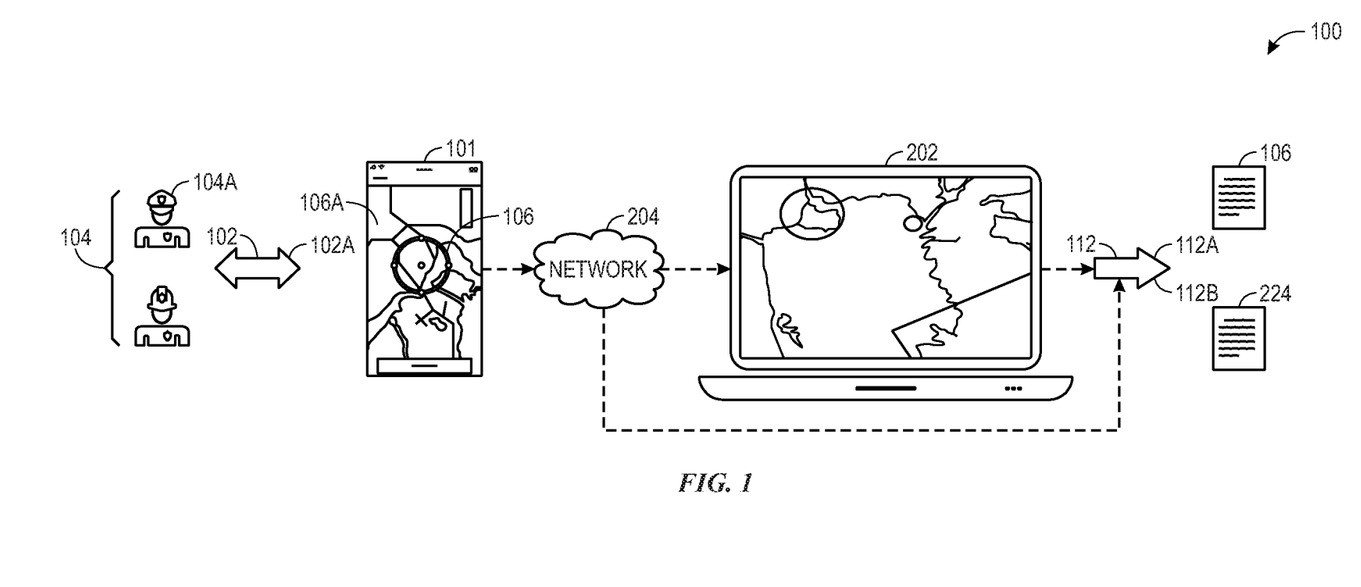
FIG. 1 is an illustration of a system for airspace management.

If the request 102 stems from an unauthorized party, it may be denied. Further, the system 100, and more particularly the application 101 distributed across users within the system 100, may correspond a particular user 104a to a limited geography 106a, i.e., a particular situs and/or a radius, to which that user's request 102 may be authorized to extend. And, if a request 102 is made outside of that authorized area, it, too, may be denied by system 100. For example, a request from the FAA, the Department of Defense, or similar U.S. national or international agency or body, may have a broad allowable geographic application, such as the entire Eastern US seaboard, while a New York Police Department (NYPD) restriction request may only have allowability within the boroughs of New York City. Needless to say, a user may make a restriction request 102 regarding all or a subset of that user's authorized restriction geography, such as a borough-by-borough request in the foregoing example of the NYPD.

Figure 2:
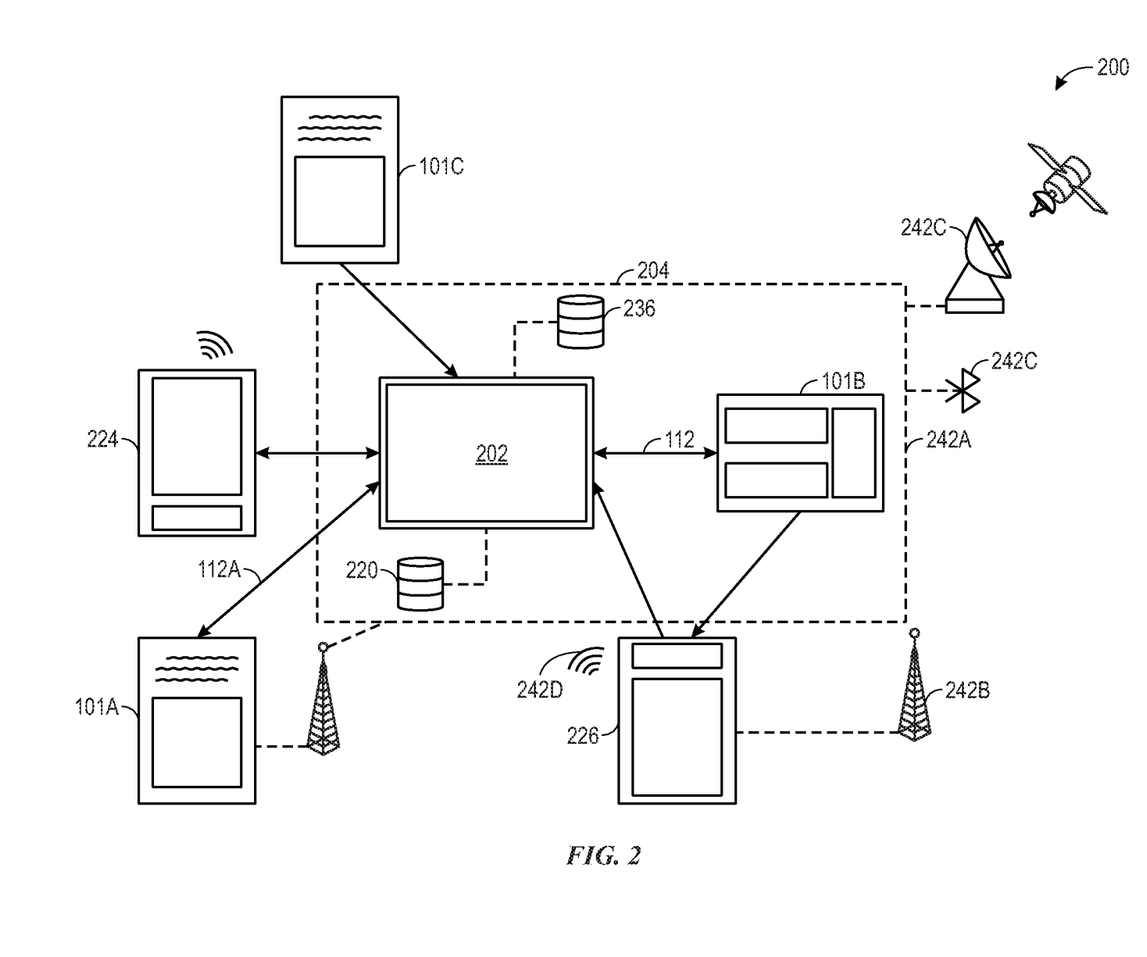
FIG. 2 is an illustration of a platform and applications for airspace management.

The multi-tenant application 101 may, such as from a central system hub having a platform 202 as discussed herein, receive authorization of a request 102 from a certified user 104 in real time, and/or may receive a distributed, such as via broadcast 112 to dedicated applications 101 and/or accepting peer applications 224, notification 112a for UAV operators regarding the granted restriction 102. Of course, notifications 112a may be distributed system wide, or, such as based on the nature of the restriction request 102, such as a request made by or for a UAV of a certain type, made by or for a UAV generally operated or authorized to operate only in a certain geography, or the like, notifications 112a may be distributed only to certain users or within a certain locale as discerned by platform 202. It should be noted that, as used herein, UAVs operated autonomously may automatically honor a granted restriction request 102, and may thus fall within the definition of a user or operator as those terms are used herein.

Thus, non-conforming UAVs subject to the notification 112a may be readily identified, such as visually or electronically (such as in embodiments that have real-time activity tracking, such as in-application or via peer application, as discussed below), for appropriate action. For example, a UAV active in a restricted zone but subject to an exclusion notification may acceptably be "shot down", or have its owner/operator subjected to criminal penalties. Moreover, in embodiments having activity tracking for all registered UAVs, the application 101 may identify the offending UAV and/or its operator to the requesting user and/or to peers using the same or a peer distributed application 101, 224. Accordingly, a "warning" notification 112b may or may not be sent in-application, such as directly to the identified offending operator, that operation of the non-conforming UAV must cease immediately, prior to the undertaking of any action against the non-conforming UAV or its operator.

The architecture of the system 100 may preferably be highly secure. This level of security may be necessary, at least so that only administratively acceptable personnel may receive grants of restriction requests. Accordingly, the architectural security must carry across all communications networks through which communications must pass, including at least the cellular and packet-switched, i.e., the Internet, networks. As such, the architecture discussed throughout may be compliant with applicable standards, such as those of the National Institute of Standards and Technology (NIST).

That is, only administratively acceptable personnel, such as the first responders, EMTs, or government agencies referenced throughout, should have the requisite access to make granted restriction requests via any of various devices, including laptop and desktop computers, agency servers, and particularly mobile devices, such as smartphones. Smartphone access using the disclosed application 101 may be particularly necessary to secure, at least because the likelihood is that first responders on site at an occurrence may need to make the decision to restrict the airspace in real time at the occurrence, and thus using a mobile device, but communications in such a circumstance may also be particularly difficult to secure.

As discussed, the architecture discussed herein may be a "hub and spokes", i.e., a multi-tenant, architecture 200 in which the applications 101 referenced in FIG. 1 are associated with a central platform 202, such as that illustrated in FIG. 2. As illustrated, a platform 202 in accordance with the embodiments may be centrally located, such as via cloud 242*a* accessibility, with respect to applications 101*a*, 101*b*, 101*c* on one or more remote clients, such as mobile device clients. That is, in some embodiments, the platform 202 may allow for "thin client" operation of the remote applications 101*a*, 101*b*, 101*c* running on devices, although it will be understood that the applications may alternatively run as "thick clients", i.e., may include at least some capability to communicate peer-to-peer and provide some or all of the decision-making and broadcast processes disclosed herein throughout as resident at the platform 202, such as for redundancy purposes in the event of a failure of the network to allow connection of the applications 101 to the platform 202.

The platform 202 may also include or communicate with, such as via the cloud 204 and/or one or more of various available networks, one or more records, such as database(s) 220, that include at least identification of certified and/or registered UAVs/operators. That is, the database 220 may include either only the certifications/certification levels of UAVs/operators using the applications 101*a*, 101*b*, 101*c*, or may include a registration listing of all UAVs registered across not only applications 101*a*, 101*b*, 101*c*, and/or may also include registrations listings (or communicative association with an external system housing such listings) of UAVs registered on peer applications 224, 226.

Accordingly, in embodiments, the platform 202 of architecture 200 may provide traffic management for UAVs, either locally or system-wide (such as nationally), with uniform notifications 112*a* across applications 101*a*, 101*b*, 101*c* and/or peer applications 224, 226. The platform 202 may thus have accessible thereto one or more types of certification information in database 220, such as may reside at or have been entered into the applications 101*a*, 101*b*, 101*c*, to allow certification of an acceptable restriction request. Of course, particularly in embodiments in which UAVs are electronically identifiable (as discussed herein), the platform 202 may additionally allow for a certification notification 112*a* of which UAVs are authorized for the subject airspace if the restriction is granted. Such an authorization (rather than an exclusionary) notification 112*a* may, in turn, be relayed to the remote applications 101*a*, 101*b*, 101*c* correspondent to authorized operators and/or UAVs.

Accordingly, authorizations and notifications 112 may vary in the embodiments. For example, an authorization notification 112 may clear the identified airspace of all UAVs. Alternatively, an authorization notification 112 may clear the identified airspace of only certain UAVs. Alternatively, an authorization notification 112 may affirmatively allow only UAVs having certain affiliation or identification, such only those associated with first responders, access to the restricted airspace. Notifications 112 may be exclusionary or inclusionary, as referenced above. Of additional note, certain agency UAV operators may identify, such as in-application 101*a* communicative with the platform 202, "associated" UAVs that are non-agency, but which are eligible to operate on behalf of the agency, to avoid improper exclusionary notifications, for example.

Needless to say, the platform 202 may be a single platform, a multi-platform, or a partitioned platform. That is, a single platform may serve a plurality of different users of different types, i.e., public and private, or firefighters and police. Alternatively, different platforms may each be uniquely dedicated to users of different types in a multi-platform embodiment, i.e., hobbyists may use a different platform than a government agency, or local police may use a different platform than the Department of Homeland Security. Or, a single platform may be partitioned to serve as a multi-platform without the need for multiple distinct platforms.

In each such embodiment, the platform(s) 202 may coordinate airspace management between operators (and/or UAVs) of varying identifying criteria in database(s) 220, as administrated by the platform 202. For example, the platform 202 may include, in one or more non-transitory computing memories associated therewith, a set of airspace management rules 236. Thus, when the platform 202 receives an airspace restriction request 102 from, for example, firefighters battling a wildfire in northern California, the platform 220 may not only certify the firefighters' ability to make the request, such as using database(s) 220, but may also receive particulars from the firefighters regarding the requested airspace restriction as part of the request 102, and/or may automatically make "artificially intelligent" (AI) decisions based on prior particulars, and may apply to those particulars the airspace management rules 236.

By way of non-limiting example, the airspace management rules 236 may indicate that all operators in a 50 mile radius of the GPS location of the requesting device are to be alerted with a notification 112; that local first responders (i.e., state and local police and emergency medical personnel) are to automatically be notified and authorized to operate in the airspace because the request 102 came from firefighters; that local first responders are to be so-notified and authorized only as long as flight plans are submitted to the requesting fire department (i.e., the authorization notification 112 may be automatically withheld until the flight plans are provided, by way of non-limiting example); and/or that all private users/UAVs registered as being within 100 miles of the radius are to be notified that the subject area (i.e., the 50 mile radius) is a "no fly zone". The referenced rules 236 may use AI at least in that, for example, the firefighters may use a private UAV operator to provide fire suppressant from the air via UAV and, to the extent the fire department indicates this upon making the current or a prior request 102, the platform may use artificial intelligence to "learn" that any rule 236 that precludes the fire suppressant UAVs should be modified in the future if the fire department makes the same or a similar restriction request 102.

Thereby, the platform 202 may not only provide flight and operational authorization or preclusion notifications 112 to application users, but may additionally, automatically and/or manually via monitoring personnel, provide coordination of UAV airspace management as between agencies, different types of first responders, public and private entities and operators, and so on. This is an advantageous aspect of the embodiments, at least in that the larger the emergency, the greater the need for an effective air response becomes, and the greater the number of separate and distinct agencies and respondents that must coordinate interdepartmentally, perhaps across multiple distinct peer applications 224, 226— and this scalable coordination is provided by the disclosed multi-tenant architecture for platform 202.

Accordingly, airspace coordination may reside in the peering of the disclosed platform with other air traffic management systems acting as peer applications 224, 226, and particularly with other air traffic systems centric to UAV operations. Such systems may include those operated by the FAA, NASA, or other authorized bodies, such as the Flight Information Management System (FIMS), Unmanned Aircraft System Services (USS), and AirMap, among others. Therefore, the coordination provided by the platform 202 may include deconfliction, such as including deconfliction of flight plans, among users of different types (i.e., unmanned-to-manned, or unmanned-to-manned), as well as among users of different flight management systems (i.e., the disclosed platform-to-USS).

Thereby, recordation and/or approval of flight planes, particularly in light of competing flight plans, may be an aspect provided by the platform 202 for the applications 101, 101a, 101b, 224, 226. That is, in concert with the applications 101, 101b, 101c in affected locales (or system wide), and in concert with other flight management services and agencies 224, 226, the platform 202 may provide flight planning, authorization of flight plans, and deconfliction for UAV operations. This flight plan entry, approval and deconfliction may all be performed in an automated manner, and in real time, by the platform 202, based on information obtained from the application 101a and such as using the aforementioned air management rules 236 (which rules 236 may include a regulatory regime and/or a hierarchy of priority for users, by way of example). Of course, integration of the platform 202 with other air navigation service providers, such as through their respective applications 224, 226, such as the FAA, and/or the inclusion of a regulatory regime in the airspace management rules 236, may allow for assurance of regulatory compliance for UAV operation in some embodiments. Moreover, integrated providers and/or applications 224, 226 may have their own respective databases, such as may include administrative certification criteria and flight management databases and thus, upon integration in the embodiments, these integrated databases may act as aspects of database 220 for the disclosed systems and methods.

It will be understood that the directive in notification 112 that certain operators/UAVs are not authorized for the airspace, but rather are restricted from the airspace, also allows for conformance monitoring and enforcement. This conformance monitoring may be manual, such as visual and on-site by local personnel, or may be automated, such as in systems that electronically identify UAVs and/or allow automated positional tracking of those UAV's based on an identification (such as an electronic or like-remotely readable signature). Needless to say, this conformance monitoring also allows for any of a myriad of enforcements against violative behavior in real time, including "shoot downs" (literally or electronically, such as by electronic interference) and/or, such as in systems having UAV identification, criminal charges and/or operator suspensions. Of course, the enforcements generated by platform 202 may include indications to peer applications 224, 226, such that other agencies may be afforded the opportunity to elect an enforcement.

By way of non-limiting example, a "UAV ID" registry is currently being contemplating for all UAVs. Such a formalized system may be integrated with the embodiments, such as via database 220, to allow for identification of compliant versus non-compliant UAVs, such as based on an electronic or visual signature within the database(s) registry 220. Accordingly, non-compliant UAVs can be confirmed on-site, and enforcement against non-compliant UAVs can be improved in real time.

Further, the disclosed architecture 200 may, as referenced throughout, provide a NIST compliant cyber-secure architecture. This is, of course, highly necessary, as the certification of personnel requesting a restriction must be highly secure for obvious reasons—were the system to lack sufficient security, hackers could restrict airspace for nefarious reasons by emulating an acceptable requester. The architecture may thus provide for cyber-secure communications using any one or more means of communications, such as via the cloud 242a, a cellular network 242b, a satellite network 242c, and/or a local or wide area wireless network 242d, by way of non-limiting example.

Figure 3A:
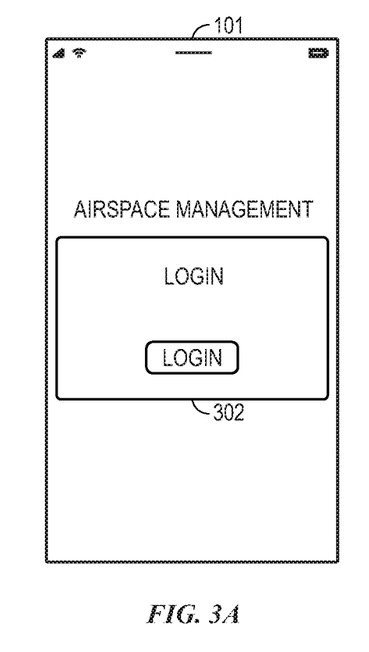
FIG. 3A is an illustration of an application user interface for airspace management.

FIGS. 3A-3E illustrate embodiments of a user interface of a first responder smartphone application, for communicative association with the platform 202 discussed throughout, for request and issuance of airspace restriction notifications 112. In the illustration of FIG. 3A, the user logs in 302 and, to the extent the user is certified as an acceptable requester for an airspace restriction, such as per registry database 220, this log in 302 communicates to the platform 202 that a restriction request may be authorized.

Figure 3B:
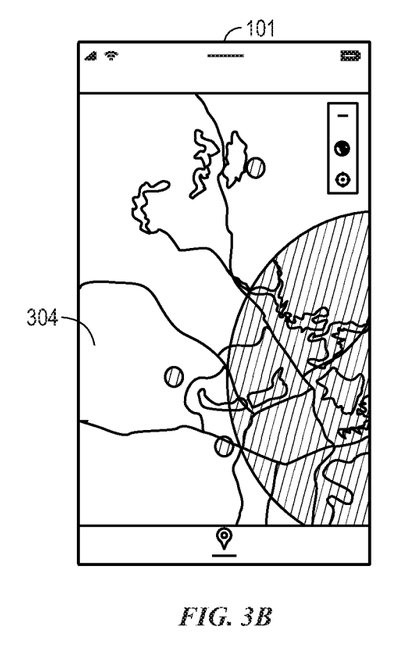
FIG. 3B is an illustration of an application user interface for airspace management.

FIG. 3B illustrates a map 304, such as may be generated based on the app-associated phone's assessed geographic position. As referenced, the locus of a request throughout may be assessed based on the current phone position of the phone on which the requesting application resides. Of course, the positional information may be provided by any known methodology, such as the global positioning system (GPS). Of course, other positioning systems may be employed, such as in place of or in conjunction with GPS, such as to provide redundancy. Such other positioning systems may include, by way of non-limiting example, triangulation systems, peer-to-peer positioning systems, a user position manual entry, and the like.

Figure 3C:
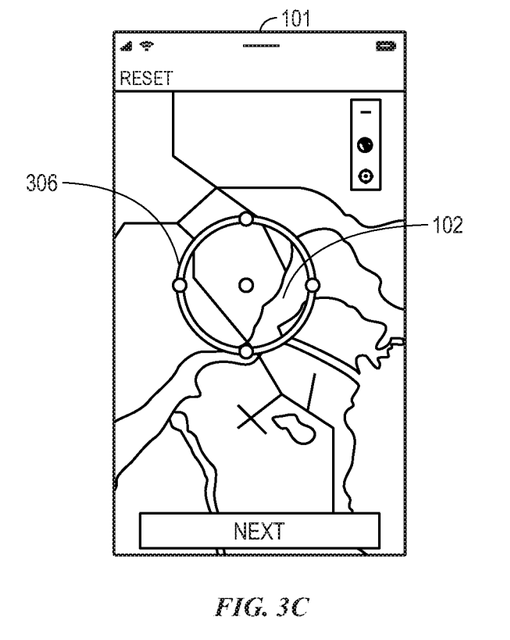
FIG. 3C is an illustration of an application user interface for airspace management.
Figure 3D:
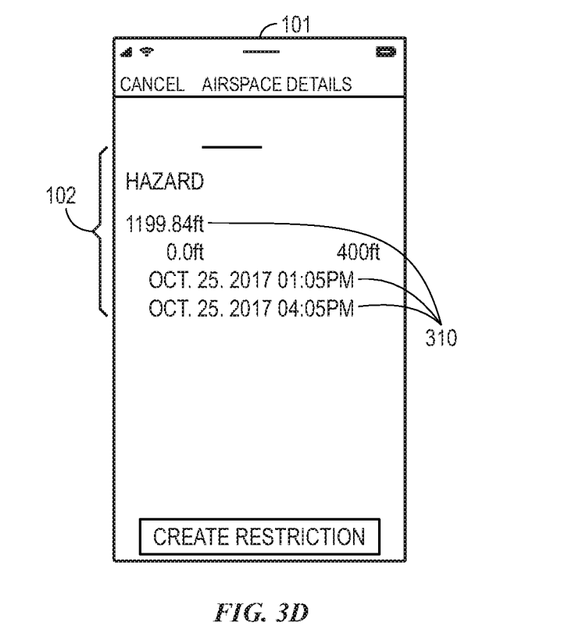
FIG. 3D is an illustration of an application user interface for airspace management.

FIG. 3C illustrates the opportunity for a user to signify a radius 306, or a "zone", either around the current phone position or around another entered position, in which an airspace restriction is requested in request 102. FIG. 3D illustrates entry by the user of the restriction and/or request details 310. Details 310 may include inclusions or exclusions (such as other agencies) for allowable operation in the restricted zone; a time (start, stop, and/or duration) requested for the restriction; differences from prior requested restrictions (such that the AI aspect of the platform may adjust the applicable rules); and so on.

Figure 3E:
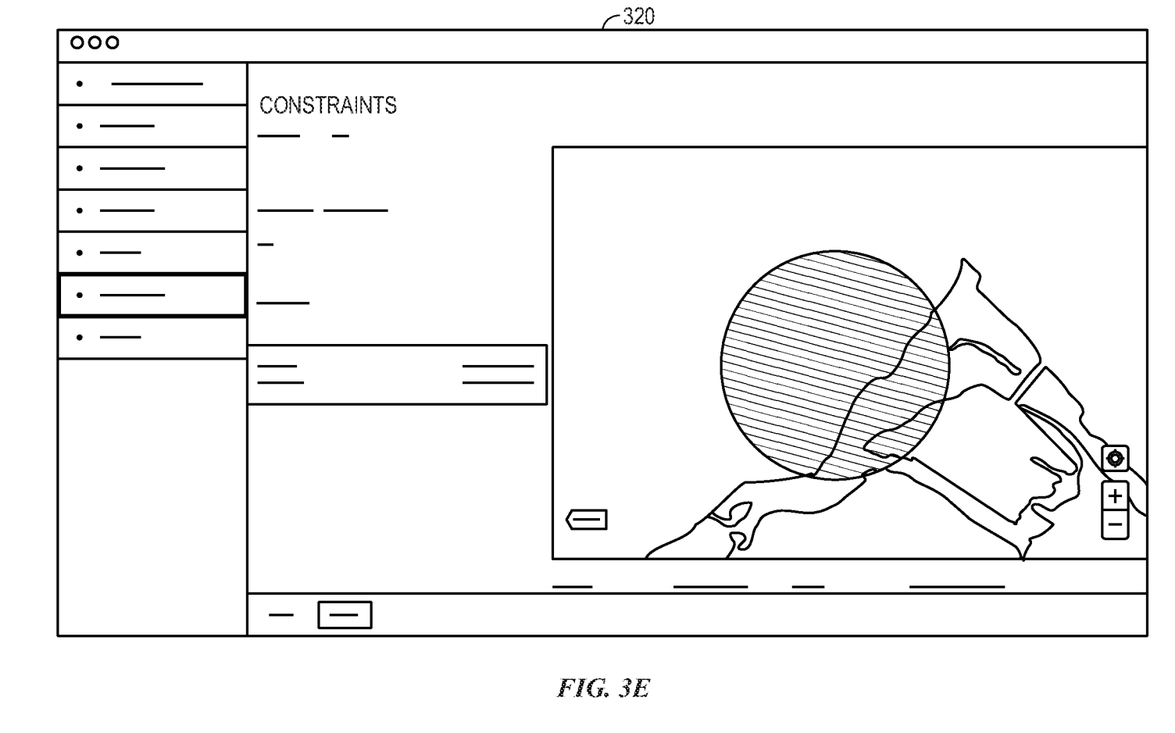
FIG. 3E is an illustration of an application user interface for airspace management.

FIG. 3E illustrates an exemplary platform user interface 320. In the illustration, the platform user interface 320 allows for examination and approval of an airspace restriction request entered into a communicative application. Thus, in the example of FIG. 3E, the criteria selected in the user interface of the exemplary application of FIGS. 3A-3D are provided to the platform of FIG. 3E for approval of the requested restriction.

As will be appreciated in light of the discussion herein, the application 101 may be operating system independent. As such, the application 101 should readily allow for interaction, such as through the platform 202 or peer-to-peer, between devices having different operating systems, such as Apple's iOS and Android, by way of non-limiting example. The application 101 may be downloadable by anyone, but usable only upon certification of the user as an authorized requestor of airspace restriction, such as using database 220. Alternatively, the application 101 may be downloadable only by an authorized user, such as by invitation only.

As discussed throughout, the application 101 may communicate with one or more platforms 202 that allow the application to serve as a "thin client". Additionally or alternatively, the applications may communicate peer-to-peer, including with peer applications 224, 226 forming part of other traffic management systems, such as those provided by the FAA. Such communication with other traffic management systems may also occur through the platform 202, rather than peer-application to peer-application, as will be understood to the skilled artisan.

An agency (or any authorized use entity) may provide one unique account identifier for all authorized personnel within the entity, for class of personnel within the entity, or unique accounts for individuals within the entity, and may set administrative capabilities for its agency user or users through a unique and secure agency "master" account, by way of non-limiting example. The agency account(s) may thus use role-base access control (RBAC), such as corresponded to log-in 302, to allow the agency to administrate users and/or UAVs, such as to activate or deactivate particular mobile applications 101a, 101b, 101c ... Needless to say, administrative divisibility may include an individual domain, or a master domain and subdomains, for each agency or for agencies in a certain category, i.e., all first responders, by way of non-limiting example.

In some embodiments, the application 101 may be distributed across many devices, such as by discrete vertical/agency type as monitored by the platform 202, and may thus allow for the gathering of data, such as in the field and via testing, across a great many situations and user types. Further, the platform 202 may therefore process and make available, such as to one or more applications 101a, 101b and/or to users of the central platform 202, at least: regular application analytics; use and performance reports based on a myriad of different filters; vital statistics and analysis; and/or audits, such as by user, by user type, by agency, etc. In addition to application analysis, data may be gathered and reported regarding the platform 202 and its metrics, such as: mobile application and platform interface performance metrics; platform and portal performance metrics; global or local use and performance data; and so on.

Figure 4:
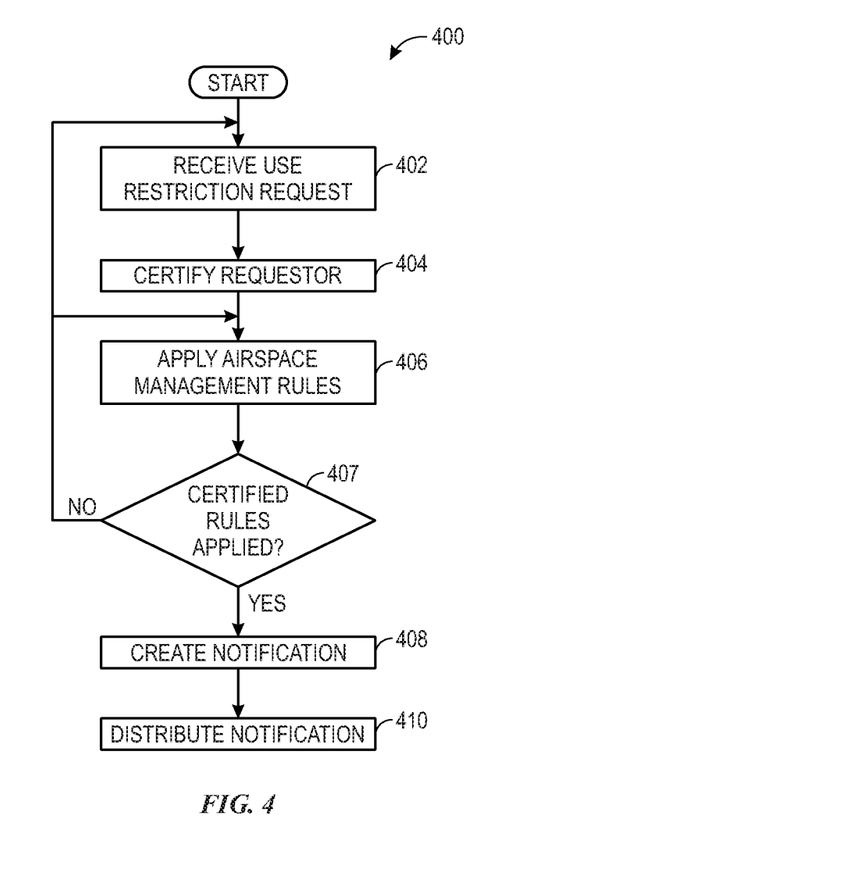
FIG. 4 is an illustration of a method for airspace management.

More particularly, and as illustrated in the flow diagram of a method 400 in FIG. 4, a user may enter a location, a time, a duration, and a reason for the airspace restriction, along with other information, and this information may be received at 402. The user's identity may also be received at 402, if not otherwise previously resident in or associated with the application. The disclosed application/platform may automatically confirm the administrative ability of the requester to make the request at 404, and that the request complies with predefined rules, and applicable state and federal rules and laws, at 406.

If compliance and certification are confirmed at 407, a notification is created at 408 and distributed to relevant UAV operators at 410, such as based on the geography, UAV types, rules, permissions, or other factors associated with a user's request, in-application identification, and/or other information. Correspondingly, the notification may be distributed over UAVs registered in a certain geography, UAVs having certain altitude capability, UAVs having certain administrative level permissions, or system-wide, by way of non-limiting example.

As referenced throughout, embodiments in accordance with the disclosure may be implemented in hardware, firmware, software, or any combination thereof, and thus embodiments may be implemented as code and/or instructions stored on or using one or more machine-readable media, which may be read and instantiated or otherwise executed by one or more processors. A machine-readable medium may include any mechanism for storing or transmitting information in a form readable by a machine (such as a computing device or a "virtual machine" running on one or more computing devices). For example, a machine-readable medium may include any suitable form of volatile or non-volatile memory.

Modules, data structures, and the like are defined and explained herein for ease of discussion, and are thus not intended to imply that any specific implementation details are required. For example, any of the described modules and/or data structures may be combined or divided into sub-modules, sub-processes or other units of computer code or data as may be required by a particular design or implementation. Moreover, it is appreciated that exemplary computing systems as described herein are merely illustrative of computing environments in which the herein described systems and methods may operate, and thus do not limit the implementation of the herein described systems and methods from computing environments having differing components and configurations. That is to say, the concepts described herein may be implemented in various computing environments using various components and configurations.

In the description herein, numerous specific details, examples, and scenarios are set forth in order to provide a more thorough understanding of the disclosure. It will be appreciated by the skilled artisan, however, that embodiments of the disclosure may be practiced without such specific details. Further, such examples and scenarios are provided for illustration, and are not intended to limit the disclosure in any way.

For example, references in the specification to "an embodiment" indicate that the embodiment described may include a particular feature, structure, or characteristic, but it should be understood that every embodiment stemming from the disclosure, whether or not described herein, may not necessarily include the particular feature, structure, or characteristic. Moreover, it should be appreciated that reference to an "embodiment" throughout is not necessarily referring to the same embodiment.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and it will thus be evident that any general principles defined herein may be applied to other variations without departing from the spirit or scope of the disclosure. Thus, the disclosure is not intended to be limited to the examples described herein, but rather is to be accorded the widest scope consistent with the principles and novel features disclosed herein.

What is claimed is:

1. A system comprising:
   records of certified acceptable requestors of use of airspace;
   a plurality of airspace management rules; and
   a broadcast interface for enabling notifications over at least one telecommunications network,
   wherein the system is configured to:

receive an airspace use request for granting a restriction area and an identification of a requestor for the airspace use request from an application of a mobile device of a requestor over the at least one telecommunications network;

determine whether the airspace use request is certified based on a comparison of the identification of the requestor to the records; and authorize a broadcast of a notification of the granted restriction area to a plurality of applications of mobile devices different from the mobile device of the requestor in accordance with the plurality of airspace management rules in response to determination that the airspace use request is certified based on a comparison of the identification of the requestor to the records.

2. The system of claim 1, wherein the notification is broadcast by at least one peered application in receipt of the authorization.

3. The system of claim 2, wherein the peered application comprises a manned aircraft airspace management application.

4. The system of claim 1, wherein the notification comprises an unmanned aerial vehicle (UAV) use exclusion.

5. The system of claim 4, wherein the UAV use exclusion is broadcast only to ones of the plurality of applications identified as corresponded to restricted UAVs based on the identification.

6. The system of claim 1, wherein the notification is system-wide or geographically-based.

7. The system of claim 1, wherein the notification includes an authorization allowing a predetermined group of vehicles to operate in the airspace.

8. The system of claim 1, wherein the plurality of airspace management rules include one or more deconfliction rules; and the deconfliction rules include rules for deconflicting flight plans among vehicles or deconflicting flight plans among a plurality of flight management systems.

9. The system of claim 1, wherein the system includes a single platform, a multi-platform, or a partitioned platform.

10. The system of claim 1, wherein the airspace use request further comprises a UAV flight plan, and wherein the UAV flight plan is additionally forwarded to the system.

11. The system of claim 10, wherein the plurality of airspace management rules further comprises flight plan approval rules, and wherein the UAV flight plan is approved by the system according to a comparison of the UAV flight plan to the flight plan approval rules.

12. The system of claim 1, wherein the notification comprises an UAV use grant.

13. The system of claim 12, wherein the UAV use grant is broadcast only to ones of the plurality of applications identified as corresponded to allowable UAVs based on the identification.

14. The system of claim 1, wherein the system is configured to determine whether the airspace use request complies with the airspace management rules; and authorize the broadcast of the notification related to the airspace use request to the plurality of applications in response to determination that the airspace use request complies with the airspace management rules.

15. The system of claim 1, wherein the plurality of airspace management rules include one or applicable state and federal rules and laws.

16. The system of claim 1, wherein, upon violation of the notification by at least one non-conforming UAV, the system compares the records to the identification of the non-conforming UAV and broadcasts the identification of the non-conforming UAV to at least one of the plurality of applications.

17. The system of claim 16, wherein the at least one of the plurality of applications that receives the identification of the non-conforming UAV is corresponded to law enforcement.

18. The system of claim 1, wherein the requestor comprises a first responder.

19. The system of claim 1, wherein the airspace use request comprises at least aircraft inclusions and exclusions; a restriction timeframe; and differences from prior airspace use requests.

20. The system of claim 1, wherein the identification is for an agency that provides role-base access control.

21. The system of claim 1, wherein the requestor is physically present within a geographic area of the airspace use request.

* * * * *